United States Patent
Palanki

(10) Patent No.: US 12,447,411 B2
(45) Date of Patent: Oct. 21, 2025

(54) IMMERSIVE REALITY ENABLED SECURITY GAMIFICATION ENVIRONMENT

(71) Applicant: American Express Travel Related Services Company, Inc., New York, NY (US)

(72) Inventor: Hiranmayi Palanki, Tampa, FL (US)

(73) Assignee: American Express Travel Related Services Company, Inc., New York, NY (US)

(*) Notice: Subject to any disclaimer, the term of this patent is extended or adjusted under 35 U.S.C. 154(b) by 170 days.

(21) Appl. No.: 18/227,399

(22) Filed: Jul. 28, 2023

(65) Prior Publication Data

US 2025/0032935 A1   Jan. 30, 2025

(51) Int. Cl.
*A63F 13/792* (2014.01)
*A63F 13/52* (2014.01)

(52) U.S. Cl.
CPC ............ *A63F 13/792* (2014.09); *A63F 13/52* (2014.09)

(58) Field of Classification Search
CPC ............................... A63F 13/792; A63F 13/52
See application file for complete search history.

(56) References Cited

U.S. PATENT DOCUMENTS

| | | | | |
|---|---|---|---|---|
| 2012/0258437 | A1* | 10/2012 | Sadeh-Koniecpol | G06F 21/56 434/362 |
| 2013/0167707 | A1* | 7/2013 | Shimizu | G09B 15/00 463/9 |
| 2014/0199663 | A1* | 7/2014 | Sadeh-Koniecpol | H04L 63/1408 434/118 |
| 2015/0094139 | A1* | 4/2015 | Kargar | A63F 13/61 463/29 |
| 2019/0303583 | A1* | 10/2019 | Hosking | G09B 5/06 |
| 2023/0237471 | A1* | 7/2023 | Siedleczka | G06Q 20/389 705/75 |
| 2024/0181349 | A1* | 6/2024 | Lee | A63F 13/35 |

* cited by examiner

*Primary Examiner* — Steve Rowland
(74) *Attorney, Agent, or Firm* — STERNE, KESSLER, GOLDSTEIN & FOX P.L.L.C.

(57) ABSTRACT

Disclosed herein are aspects for dispersing a non-fungible token in response to a security program. An aspect begins by generating a three-dimensional virtual world. The aspect continues by receiving a request to access a test program as part of a security program in the three-dimensional virtual world. The test program includes a display of a source code and instructions for a user to resolve an associated challenge. The aspect then determines a tier of the user, where the tier indicates progress of the user in resolving challenges corresponding to the security program. The test program is generated based on the tier of the user and is generated on a user device through a perspective of a virtual camera. The aspect continues by receiving a resolution to the challenge. A non-fungible token is then generated based on the resolution, assigned to a digital wallet, and recorded on a blockchain.

20 Claims, 7 Drawing Sheets

400

| Tier | Description | Assigned Users |
|---|---|---|
| 1 | Finds and remediates vulnerabilities within various technologies. | 1 |
| 2 | Attacks and compromises an application, server, and micro service. | 2, 6, 7, 8 |
| 3 | Integrates tools within web, mobile, API, cloud and/or mainframe. | 3, 5 |
| 4 | Analyzes, interprets, and communicates complex vulnerabilities. | 9 |
| 5 | Illustrates and organizes data or processes for multiple use cases. | 4, 10 |

FIG. 4

IMMERSIVE REALITY ENABLED SECURITY GAMIFICATION ENVIRONMENT

BACKGROUND

Technical Field

Aspects of the present disclosure relate to components, systems, and methods for security programs in three-dimensional virtual environments.

Background

Use of computers is commonplace for individuals and organizations. With this use of computers, security vulnerabilities are common and pose a threat to the information of individuals and organizations. It is important to protect computers from security vulnerabilities and to provide robust training to users in preventing, detecting, and resolving security vulnerabilities. Often times, typical methods are used to protect computers and in-person techniques are used when training users. Training, however, is cumbersome and users are not inclined or incentivized to perform such training. While attempts at generating entertaining trainings have been deployed, the systems are not rewarding or engaging. This results in users not retaining the training or failing to complete the training.

SUMMARY

In aspects presented herein, a security gamification platform can provide a security challenge to a user in a three-dimensional virtual world and can disperse a non-fungible token to the user based on a resolution to the challenge.

In an aspect, an example method for dispersing a non-fungible token in response to a security program is described. A virtual world platform generates a three-dimensional virtual world. A user interacts in the three-dimensional virtual world from a perspective of a virtual camera corresponding to a virtual avatar, and the virtual camera and virtual avatar are controlled by a user device. The virtual world platform then receives a request to access a test program as part of a security program in the three-dimensional virtual world. The request is generated using the user device, and the test program comprises a display of a source code and instructions for the user to resolve a challenge associated with the source code. The virtual world platform then determines a tier of the user. The tier indicates progress of the user in resolving challenges corresponding to the security program. The test program is then generated based on the tier of the user and is generated on the user device through the perspective of the virtual camera. The virtual world platform then receives a resolution to the challenge associated with the source code. The resolution is generated using the user device. Finally, the virtual world platform generates a non-fungible token based on the resolution. The virtual world platform assigns the non-fungible token to a digital wallet corresponding to the user and records the assignment on a blockchain.

Through the use of augmented reality, virtual reality, or mixed reality immersive environments, the virtual world platform may combine a security training and/or a security competition program with blockchain and non-fungible token functionality. This may provide advanced reward incentives to improve computer vulnerability mitigation.

System, device, and computer-readable medium aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

FIG. 4 is a table of user security program tiers, according to some aspects of the present disclosure.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Provided herein are apparatus, device, system, method and/or computer-readable medium aspects, and/or combinations and sub-combinations thereof for dispersing a non-fungible token in response to a security program in a three-dimensional virtual world.

Figure 1:
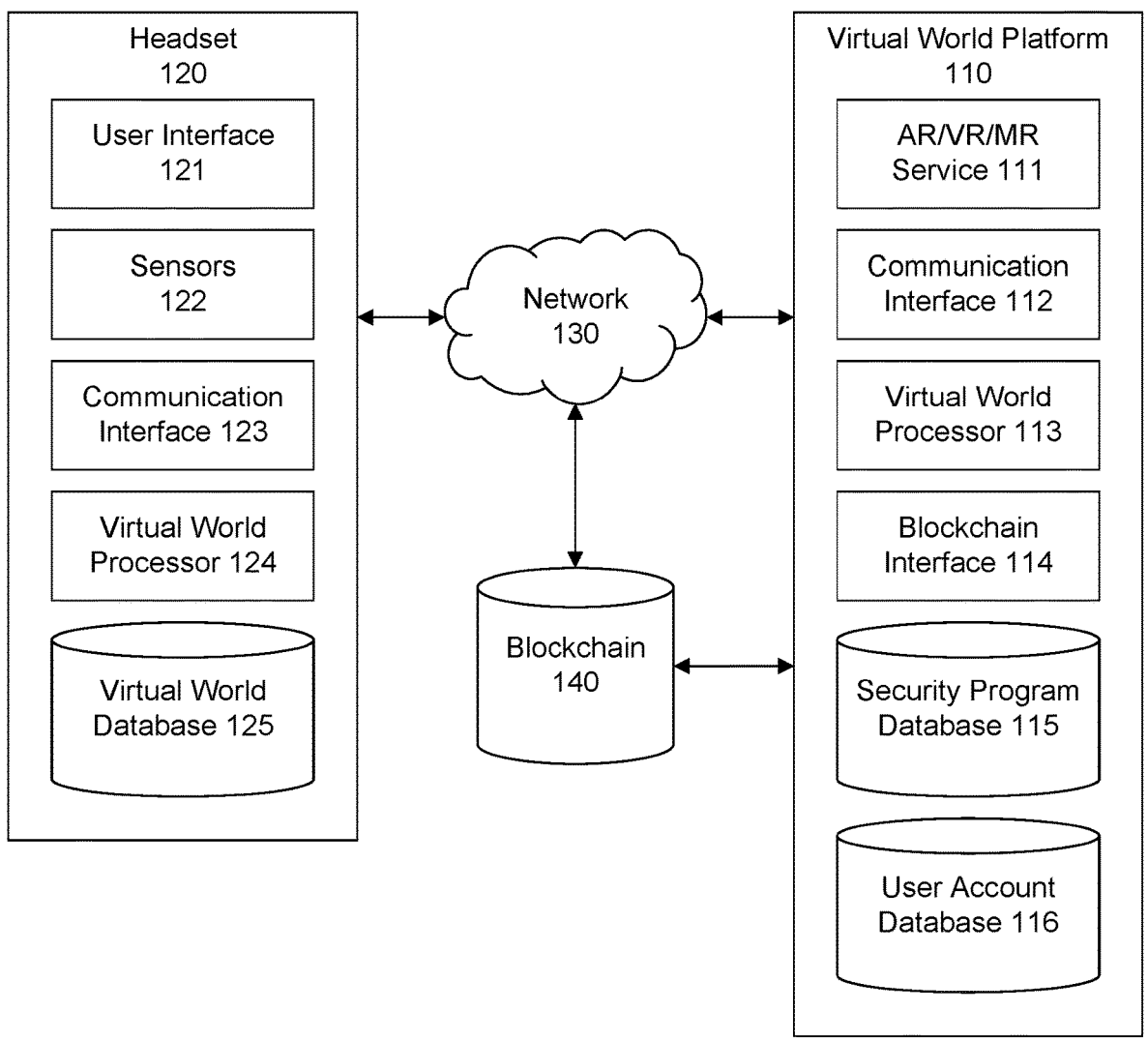
FIG. 1 is a block diagram of a security gamification environment, according to some aspects of the present disclosure.

FIG. 1 is a block diagram of a security gamification environment 100, according to some aspects of the present disclosure. Security gamification environment 100 can include at least a virtual world platform 110, a headset 120, a network 130, and a blockchain 140.

Virtual world platform 110 can be configured to generate virtual worlds, receive information from other computer entities, generate security programs, determine user statuses, and process rewards associated with security programs. Virtual world platform 110 can be or include one or more servers, services, databases, and/or a combination thereof. For example, virtual world platform 110 may include a management server that manages interactions with other system components (e.g., communication interface 112). Virtual world platform 110 can be implemented on a server computer, virtual machine, container, cloud-computing platform, or other device. Virtual world platform 110 can be implemented on a desktop computer, laptop, tablet, smartphone, or other device.

Virtual world platform 110 can include at least an augmented reality (AR)/virtual reality (VR)/mixed reality (MR) service 111, a communication interface 112, a virtual world processor 113, a blockchain interface 114, a security program database 115, and a user account database 116. Each of the AR/VR/MR service 111, communication interface 112, virtual world processor 113, blockchain interface 114, security program database 115, and user account database 116 can interface with one another through one or more communications channels. The one or more communications channels can be wired, wireless, or a combination thereof. The one or more communications channels can include any combination of Local Area Networks, Wide Area Networks, the Internet, etc. Control logic or data can be transmitted to and from each entity via the one or more communications channels. In some aspects, AR/VR/MR service 111, communication interface 112, virtual world processor 113, and/or blockchain interface 114 may be implemented on one or more servers of virtual world platform 110.

AR/VR/MR service 111 can generate a three-dimensional virtual world. AR/VR/MR service 111 can generate the three-dimensional virtual world and can transmit it to a user device, such as headset 120, through communication interface 112 and network 130. The three-dimensional virtual world can also be generated by AR/VR/MR service 111 in combination with one or more components of headset 120 (e.g., virtual world processor 124, virtual world database 125), or solely using one or more components of headset 120 (e.g., virtual world processor 124, virtual world database 125). AR/VR/MR service 111 can generate the three-dimensional virtual world as an augmented reality, virtual reality, or mixed reality environment. For example, the three-dimensional virtual world can be a metaverse. An augmented reality environment can be understood as one where a user views some amount of imagery of a synthetic environment as part of the user's view of the real environment. A virtual reality environment can be understood as one where a user is immersed in, and able to interact with, a fully synthetic environment. A mixed reality environment can be understood as covering a variety of environment configurations on a continuum. For example, a mixed reality environment can include elements from an augmented reality environment and/or a virtual reality environment.

The three-dimensional virtual world can be configured to support one or more users. Each user of the three-dimensional virtual world can interact in the three-dimensional virtual world from a perspective of a virtual camera corresponding to a virtual avatar. The virtual camera can correspond in location to the virtual avatar. The virtual camera can be understood as the eyes of the virtual avatar, such that the perspective of the virtual camera provides a viewpoint to the user of what the virtual avatar sees in the three-dimensional virtual world. Similar to the eyes of a human, the perspective of the virtual camera can be changed along an x-axis, y-axis, z-axis, pan angle, tilt angle, and yaw angle. The virtual camera can provide a viewing angle or field of view based on the size of the user's viewing device (e.g., user interface 121 of headset 120). The virtual camera can also be configured for a user to view the three-dimensional virtual world from a first-person, second-person, or third-person perspective. The virtual avatar can be understood as a three-dimensional model within the three-dimensional virtual world, representing a user. The virtual avatar can be configured as a human-like character, an animal, an object, or another entity. The virtual avatar can be configured to include a real-time video stream of the corresponding user, as captured by a camera on a user device (e.g., sensors 122 of headset 120). Similar to human movement, the position of the virtual avatar can be changed in a forward, backward, left, and right direction on an x-axis/y-axis plane, and can access synthetic vertical space in the three-dimensional virtual world on a z-axis (e.g., jumping, going up stairs, etc.). In an example, a first user can interact in the three-dimensional virtual world from a perspective of a first virtual camera corresponding in location and perspective to a first virtual avatar. In an aspect involving more than one user, a second user can interact in the three-dimensional virtual world from a perspective of a second virtual camera corresponding to a second virtual avatar.

The virtual camera and virtual avatar can be controlled by a user device. Using a wearable device, desktop computer, laptop, tablet, smartphone, microphone, keyboard, track pad, computer mouse, touchscreen, joystick or other device (e.g., headset 120), a user can view and change the perspective of the virtual camera and can change the location of the virtual avatar in the three-dimensional virtual world. For example, a user can view the three-dimensional virtual world using user interface 121 and can interact in the three-dimensional virtual world using sensors 122 of headset 120.

The three-dimensional virtual world can be configured similar to a real-world space. In some aspects, the three-dimensional virtual world can be configured as an office space, an outdoor space, a stadium, a home, an apartment, a grocery store, a movie theater, a concert hall, an arena, or any other physical space. The three-dimensional virtual world can be configured as a certain physical space using one or more virtual objects. For example, in a three-dimensional virtual world that is configured as an office space, the three-dimensional virtual world can include virtual objects such as desks, office chairs, presentation screens, and office supplies.

Virtual objects can be three-dimensional models in the three-dimensional virtual world. Virtual objects can represent objects in the real-world environment or can be unique synthetic objects. For example, a virtual object can have the same size dimensions as an object in the real world or can have different dimensions from an object in the real world. In some aspects, the one or more virtual objects can be interactive. A user can activate an interactive virtual object by positioning their avatar within a predetermined proximity of the virtual object, by clicking on the virtual object (e.g., clicking a computer mouse over the object, touching a touch-screen over the object, etc.), by inputting a pre-configured quick-key, or by other inputs.

In some aspects, one or more virtual objects can include an interactive virtual object that, when activated by a user, generates a request for generation of additional features within the three-dimensional virtual world. The request can be generated by a user device (e.g., headset 120) and sent to virtual world platform 110 or can be generated by virtual world platform 110. In some aspects, the request for additional features within the three-dimensional virtual world can be generated absent an interactive virtual object.

Additional features can be stored in databases, such as security program database 115, and can be retrieved from the database and generated by AR/VR/MR service 111 upon activation. Additional features can include interactive games, media (e.g., a slideshow of pictures, a video), or other content. In some aspects, the additional features can include a security program. The security program may be a software application executed by virtual world platform 110 and/or headset 120. The security program can train users in preventing computer security vulnerabilities, train users in detecting computer security vulnerabilities, train users in resolving computer security vulnerabilities, and/or inform users about computer security vulnerabilities. The security program can be made up of one or more test programs. The test programs can be configured to test different users in different ways. For example, one test program can test a novice user in detecting computer security vulnerabilities, while another test program can test an expert user in resolving computer security vulnerabilities. Accordingly, each test program can be configured with relevant content, such as a display of a source code. Each test program can also include instructions for the user to resolve a challenge associated with the source code. For example, a computer security vulnerability can be hidden in the source code and the challenge can be for the user to detect the vulnerability. The test programs can be generated by AR/VR/MR service 111; transmitted to headset 120 through communication interface 112, network 130, and communication interface 123; and rendered at headset 120 using virtual world processor 124, such that a user can view the test programs through the perspective of the virtual camera via user interface 121. In some aspects, the test programs can be partly generated by AR/VR/MR service 111, such that the remainder is generated by virtual world processor 124 using information stored in virtual world database 125 of headset 120, or the test program can be entirely generated at headset 120.

The specific content of the test program can be based on the knowledge or experience of a particular user. Information on the knowledge or experience of a particular user can be stored in databases, such as user account database 116. In some aspects, user account database 116 can store information about progress of a user in resolving challenges corresponding to a security program. In some aspects, a test program can be generated based on the tier of the user. In some aspects, a test program challenge can be selected, from a plurality of challenges corresponding to the security program in security program database 115, based on the tier of the user. In some aspects, security program progress can be indicated by a user tier, as described with reference to FIG. 4.

In some aspects, test programs can be provided to more than one user. For example, a second user can activate a virtual object, generating a second request for generation of additional features within the three-dimensional virtual world. The request can be generated by a user device corresponding to the second user (e.g., headset 120) and can be sent to virtual world platform 110. The test program can be provided to the second user through the perspective of the second virtual camera, generated on the second user device (e.g., headset 120).

In aspects involving more than one user, the test program can be collaborative or competitive in nature. For example, two users can collaborate with one another in resolving a challenge associated with a test program source code. Alternatively, two users can compete against one another in resolving a challenge associate with a test program source code. In some aspects, the test program can include a capture-the-flag competition. A capture-the-flag competition may include a program where users, or teams of users, collect flags by solving a number of challenges. In some aspects, a test program challenge can test various computer security vulnerabilities. For example, the test program challenge can provide challenges, such as broken access control, cryptographic failures, injection, insecure design, security misconfiguration, vulnerable and outdated components, identification and authentication failures, software and data integrity failures, security logging and monitoring failures, server-side request forgery, and/or other network and/or software development security issues. In some aspects, a test program challenge can be based on an Open Worldwide Application Security Project (OWASP R) computer security vulnerability. For example, the test program challenge can be based on an OWASPR Top 10 Web Application Security Risk. In some aspects, the test program can include a coding laboratory. A coding laboratory can include one or more computer vulnerability explanations in text format or video format. A coding laboratory can also include simulated computer attack walkthroughs, demonstrating to a user a process for resolving a computer attack.

The appearance or shape of the virtual object can be related to the additional features generated upon activation. For example, in aspects where the three-dimensional virtual world is configured to provide a capture-the-flag security program, a virtual object can appear as a flag in the three-dimensional virtual world (e.g., FIG. 3).

Using sensors 122 of headset 120, a user can generate one or more resolutions to the test program challenges. The resolution can be communicated to AR/VR/MR service 111 through communication interface 123, network 130, and communication interface 112. Upon receiving a resolution from a user (e.g., through headset 120) to a challenge associate with source code in a test program, a reward (e.g., non-fungible token) can be generated. In some aspects, the reward can be generated by blockchain interface 114 and can be transmitted to headset 120. The reward can also be displayed to the user through the perspective of the virtual camera. The reward can be displayed in the three-dimensional virtual world as an interactive virtual object, where a user can select the reward or can select one of multiple possible rewards.

AR/VR/MR service 111 can be a service, a server, or a combination thereof. AR/VR/MR service 111 can be implemented on a server computer, virtual machine, container, cloud-computing platform, or other device. AR/VR/MR service 111 can be implemented on a desktop computer, laptop, tablet, smartphone, or other computing device. The three-dimensional world can be further understood with reference to FIGS. 2-5.

Communication interface 112 can manage, send, and receive communications from entities within virtual world platform 110. For example, communication interface 112 can transmit user tier information from user account database 116 to AR/VR/MR service 111. Communication interface 112 can manage, send, and receive communications among virtual world platform 110, network 130, and blockchain 140. Accordingly, communication interface 112 can manage, send, and receive communications from headset 120, through network 130. For example, communication interface 112 can transit three-dimensional virtual world data from AR/VR/MR service 111 to headset 120, through network 130. Communication interface 112 can be a service, a server, or a combination thereof. Communication interface 112 can be implemented on a server computer, virtual machine, container, cloud-computing platform, or other device. Communication interface 112 can be implemented on a desktop computer, laptop, tablet, smartphone, or other device.

Virtual world processor 113 can be a processor implemented on a server or a computing device that is capable of executing program instructions for virtual world platform 110. Virtual world processor 113 can include an artificial intelligence engine. The artificial intelligence engine can include a neural network, such as an artificial neural network, convolutional neural network, or recurrent neural network. Artificial intelligence engine can include a machine learning engine or decision trees. Analyses for virtual world platform 110 can be at least partially performed by the artificial intelligence engine. For example, the artificial intelligence engine can determine the appropriate test program to generate for a particular user, based on information from user account database 116. Additionally, the artificial intelligence engine can be configured to generate metrics associated with a user. For example, a metric can be generated for a user based on a tier of the user (e.g. from user account database 116), a test program (e.g., from security program database 115), a resolution to a test program challenge, and a non-fungible token (e.g., from blockchain interface 114). The metric can indicate a level of improvement of the user, or of a team of users, in detecting computer security vulnerabilities.

Virtual world processor 113 can be a service, a server, or a combination thereof. Virtual world processor 113 can be implemented on a server computer, virtual machine, container, cloud-computing platform, or other device. Virtual world processor 113 can be implemented on a desktop computer, laptop, tablet, smartphone, or other device.

Blockchain interface 114 can generate non-fungible tokens or other rewards, can assign non-fungible tokens or other rewards to digital wallets corresponding to users, and can record assignment of the non-fungible tokens or other rewards to blockchain 140. The digital wallets can correspond to a blockchain wallet stored on blockchain 140, an asset account, a financial account, or another digital account capable of settling transactions, such as microtransactions. The non-fungible tokens or other rewards can be generated based on resolutions to test program challenges, as described above. Blockchain interface 114 can be a service, a server, or a combination thereof. Blockchain interface 114 can be implemented on a server computer, virtual machine, container, cloud-computing platform, or other device. Blockchain interface 114 can be implemented on a desktop computer, laptop, tablet, smartphone, or other device.

Security program database 115 can store security programs and associated test programs and challenges. Security program database 115 can be a database management system (DBMS). Security program database 115 can be a secure store. Security program database 115 can be located at a single location or multiple locations. Security program database 115 can be implemented on a server computer, virtual machine, container, cloud-computing platform, or other device. Security program database 115 can be implemented on a desktop computer, laptop, tablet, smartphone, or other device.

User account database 116 can store information on the knowledge or experience of a particular user. User account database 116 can store information about progress of a user in resolving challenges corresponding to a security program. This program can be indicated by a user tier. In an example aspect, user account database 116 can store data tables including information on user tier assignments. For example, user account database 116 can store a table including five tier possibilities. Tier 1 can indicate that a user is able to find and remediate vulnerabilities within various technologies. Tier 2 can indicate that a user is able to attack and compromise an application, server, and micro service. Tier 3 can indicate that a user is able to integrate tools within web, mobile, API, cloud, and/or mainframe systems. Tier 4 can indicate that a user is able to analyze, interpret, and communicate complex vulnerabilities. Tier 5 can indicate that a user can illustrate and organize data or processes for multiple use cases. In some aspects, a data table can be configured with more or less than five possible tiers.

User account database 116 can be a DBMS. User account database 116 can be a secure store. User account database 116 can be located at a single location or multiple locations. User account database 116 can be implemented on a server computer, virtual machine, container, cloud-computing platform, or other device. User account database 116 can be implemented on a desktop computer, laptop, tablet, smartphone, or other device.

Virtual world platform 110 can interface with network 130 and blockchain 140 through one or more communications channels. The one or more communications channels can be wired, wireless, or a combination thereof. The one or more communications channels can include any combination of Local Area Networks, Wide Area Networks, the Internet, etc. Control logic or data can be transmitted to and from virtual world platform 110 via the one or more communications channels. Through an interface with network 130, virtual world platform 110 can interface with headset 120.

Headset 120 can be a user device allowing a user to view and interact in a three-dimensional virtual world. Headset 120 can be implemented on or interface with a wearable headset device, desktop computer, laptop, tablet, smartphone, or other device. Headset 120 can include a service, a server, or a combination thereof. Headset 120 can contain a management server that manages interactions with other system components.

Headset 120 can include at least a user interface 121, one or more sensors 122, a communication interface 123, a virtual world processor 124, and a virtual world database 125. Each of the user interface 121, one or more sensors 122, communication interface 123, virtual world processor 124, and virtual world database 125 can interface with one another through one or more communications channels. The one or more communications channels can be wired, wireless, or a combination thereof. The one or more communications channels can include any combination of Local Area Networks, Wide Area Networks, the Internet, etc. Control logic or data can be transmitted to and from each entity via the one or more communications channels.

User interface 121 can be used by a user to view a three-dimensional virtual world from a perspective of a virtual camera and to receive and communicate information relevant to interaction in the three-dimensional virtual world. User interface 121 can be a graphical user interface, a command line interface, a menu-driven user interface, a touch user interface, a voice user interface, a form-based user interface, or a natural language user interface, or another user interface.

One or more sensors 122 can monitor a user and can allow a user to interact with a security program provided by virtual world platform 110. For example, a user can use one or more sensors 122 to activate a virtual object for a security program in the three-dimensional virtual world, as described above. One or more sensors 122 can include imaging devices (e.g., real-world-facing cameras, user-facing cameras, etc.), microphones, inertial measurement units, accelerometers, compasses, GPS units, radio devices, gyroscopes, haptic devices, keyboards, track pads, computer mice, touchscreens, joysticks, and other devices.

Communication interface 123 can manage send, and receive communications from entities within headset 120.

For example, communication interface 123 can change a perspective of a virtual camera via user interface 121 when a user manipulates a mouse as a sensor 122. Communication interface 123 can manage, send, and receive communications from network 130. Accordingly, communication interface 123 can manage, send, and receive communications from virtual world platform 110, through network 130. For example, communication interface 123 can receive parameters of a three-dimensional virtual world and security program from virtual world platform 110, to be rendered on user interface 121 using virtual world processor 124 and virtual world database 125. Communication interface 123 can be a service, a server, or a combination thereof. Communication interface 123 can be implemented on a server computer, virtual machine, container, cloud-computing platform, or other device. Communication interface 123 can be implemented on a desktop computer, laptop, tablet, smartphone, or other device.

Virtual world processor 124 can be any suitable processor that is capable of executing program instructions for headset 120. Virtual world processor 124 can be configured to support processing within virtual world platform 110 or can be configured to perform processes previously described for virtual world platform 110. Virtual world processor 124 can be a service, a server, or a combination thereof. Virtual world processor 124 can be implemented on a server computer, virtual machine, container, cloud-computing platform, or other device. Virtual world processor 124 can be implemented on a desktop computer, laptop, tablet, smartphone, or other device.

Virtual world database 125 can store information related to a user's prior interactions with the three-dimensional virtual world, using virtual world platform 110. This information can include prior configurations of the three-dimensional virtual world; prior security program, test program, and challenge interactions; and prior interactions with other users. Virtual world database 125 can be a database management system (DBMS). Virtual world database 125 can be a secure store. Virtual world database 125 can be located at a single location or multiple locations. Virtual world database 125 can be implemented on a server computer, virtual machine, container, cloud-computing platform, or other device. Virtual world database 125 can be implemented on a desktop computer, laptop, tablet, smartphone, or other device.

Headset 120 can interface with network 130 through one or more communications channels. The one or more communications channels can be wired, wireless, or a combination thereof. The one or more communications channels can include any combination of Local Area Networks, Wide Area Networks, the Internet, etc. Control logic or data can be transmitted to and from headset 120 via the one or more communications channels. Through an interface with network 130, headset 120 can interface with virtual world platform 110 and blockchain 140.

Blockchain 140 can be configured as a record for assignment of non-fungible tokens or other rewards. Blockchain 140 can include a digital wallet, such as a blockchain wallet, useful when recording assignment of non-fungible tokens or other rewards to blockchain 140. For example, when a non-fungible token is generated by blockchain interface 114 based on a resolution to a test program challenge, blockchain interface 114 can interact with blockchain 140, via communication interface 112 and/or network 130, to assign the non-fungible token to a digital wallet corresponding to the user. The assignment can be recorded on blockchain 140.

Blockchain 140 can be a distributed ledger that maintains records in a readable manner and that is resistant to tampering. Blockchain 140 can include a system of interconnected blocks containing data. The blocks can hold transfer data, smart contract data, and/or other information (e.g., digital assets, etc.) as desired. Each block can link to the previous block and can include a timestamp. Blocks can be linked because each block can include a hash of the prior block in blockchain 140. The linked blocks form a chain, with only one successor block allowed to link to one other predecessor block. When implemented in support of virtual world platform 110, blockchain 140 can serve as an immutable record for non-fungible token assignments and related communications. In some aspects, blockchain 140 can be a peer-to-peer network that is private, consortium, or public (e.g., Ethereum, Bitcoin, etc.). Consortium and private networks (e.g., network 130) can offer improved control over the content of the blockchain, and public networks can leverage the cumulative computing power of the network to improve security. In some aspects, blockchain 140 can be implemented using technologies, for example, Ethereum GETH, eth-light wallet, or other suitable blockchain interface technologies. Blockchain 140 can be maintained on various nodes in the form of copies of the blockchain. Validation of API transactions can be added to blockchain 140 by establishing consensus between the nodes based on proof of work, proof of stake, practical byzantine fault tolerance, delegated proof of stake, or other suitable consensus algorithms.

Network 130 can be configured to exchange information among virtual world platform 110, blockchain 140, and headset 120. One or more of virtual world platform 110, blockchain 140, and headset 120 can be hosted on network 130 or can be hosted separately from network 130. Network 130 can be a cloud computing network, an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Figure 2:
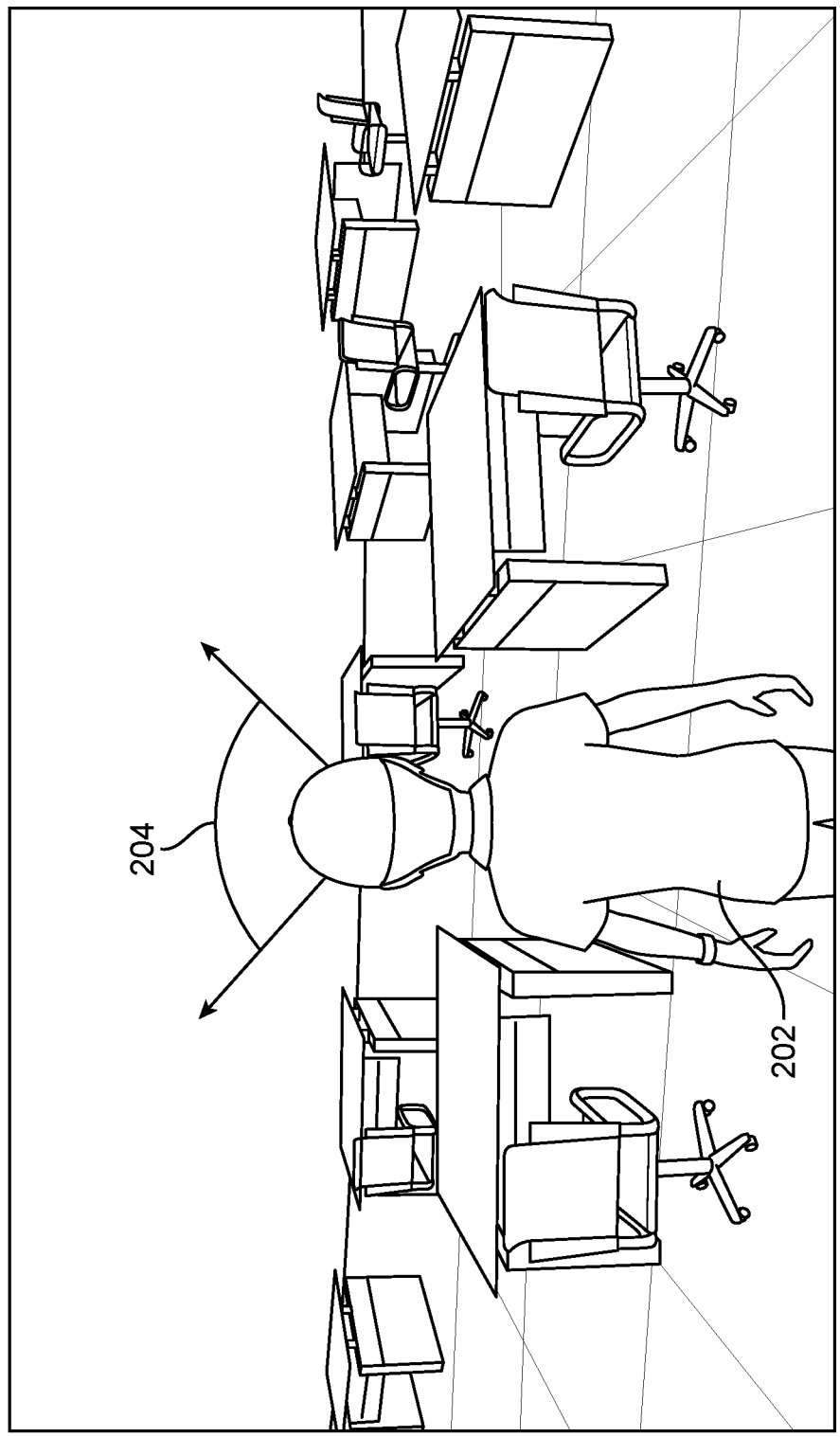
FIG. 2 is an illustration of a three-dimensional virtual world, according to some aspects of the present disclosure.

FIG. 2 is an illustration 200 of a three-dimensional virtual world, according to some aspects of the present disclosure. A user can interact in the three-dimensional virtual world through virtual avatar 202 and can view the three-dimensional virtual world through a perspective of virtual camera 204. Perspective of virtual camera 204 can be understood as a viewing angle or field of view of virtual avatar 202, viewable to a user on a user device.

In some aspects, a user can control virtual avatar 202 and virtual camera 204 using headset 120. For example, a user can control virtual avatar 202 using sensors 122 and can view the perspective of virtual camera 204 using user interface 121. For example, as described with reference to FIG. 1, a user using headset 120 can view the three-dimensional virtual world from user interface 121, displaying the perspective of virtual camera 204. Using sensors 122 of headset 120, the user can change the perspective of virtual camera 204 and can move the location of virtual avatar 202.

Figure 3:
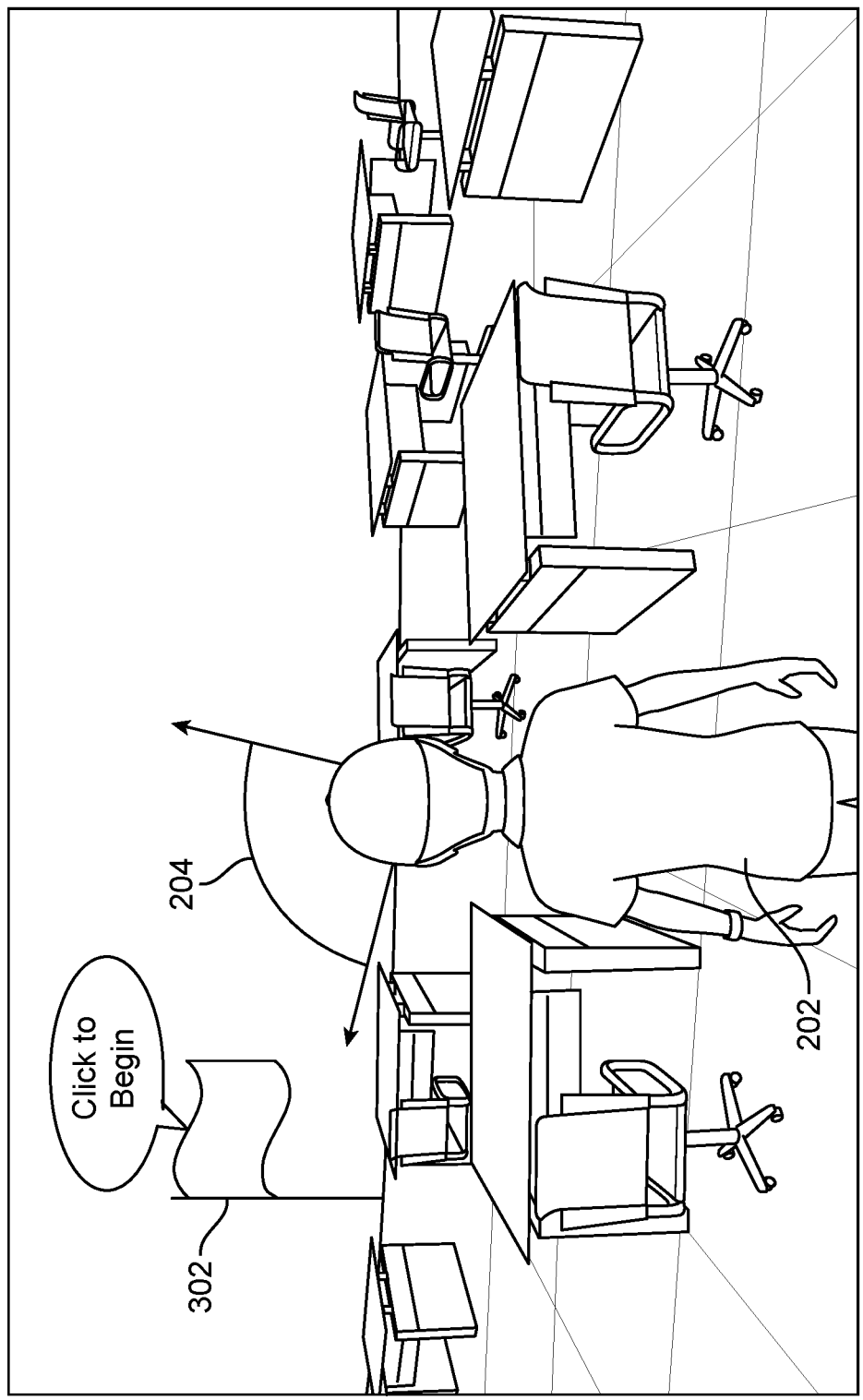
FIG. 3 is an illustration of a test program request in the three-dimensional virtual world, according to some aspects of the present disclosure.

FIG. 3 is an illustration of a test program request 302 in the three-dimensional virtual world, according to some aspects of the present disclosure. As described with reference to FIG. 2, a user can interact in the three-dimensional virtual world through virtual avatar 202 and can view the three-dimensional virtual world through a perspective of virtual camera 204. The three-dimensional virtual world can also include the test program request 302. The three-dimensional virtual world can be configured to include test program request 302 as a virtual world object.

For example, as described with reference to FIG. 1, when activated by a user, test program request 302 can generate a request for generation of additional features within the three-dimensional virtual world. The request can be activated by the user using sensors 122. As shown, test program request 302 is configured as a capture-the-flag security program virtual world object, where when the user activates the object using sensors 122, a request is generated to access a capture-the-flag test program as provided by virtual world platform 110.

FIG. 4 is a table 400 of user security program tiers, according to some aspects of the present disclosure. Table 400 can be stored in a database, such as in user account database 116 or virtual world database 125, as described with reference to FIG. 1. A test program can be generated based on the tier of the user.

As shown, table 400 includes five possible tiers. Tier 1 can indicate that a user is able to find and remediate vulnerabilities within various technologies. Tier 2 can indicate that a user is able to attack and compromise an application, server, and micro service. Tier 3 can indicate that a user is able to integrate tools within web, mobile, API, cloud, and/or mainframe systems. Tier 4 can indicate that a user is able to analyze, interpret, and communicate complex vulnerabilities. Tier 5 can indicate that a user can illustrate and organize data or processes for multiple use cases. Users can be assigned to one of the five possible tiers based on their past progress in resolving test program challenges, as described with reference to FIG. 1. In some aspects, table 400 can be configured with more than five possible tiers. In some aspects, table 400 can be configured with less than five possible tiers. In some aspects, not all tiers may have assigned users. Table 400 can be generated and updated using processors and artificial intelligence engine, as described with reference to FIG. 1. For example, virtual world processor 113 can access user account database 116 to access table 400. Virtual world processor 113 can be configured to edit or delete at least a portion of table 400. In another example, communication interface 112 can access user account database 116 to retrieve table 400. Communication interface 112 can then deliver table 400 to AR/VR/MR service 111 for generation of a test program in the three-dimensional virtual world.

Figure 5:
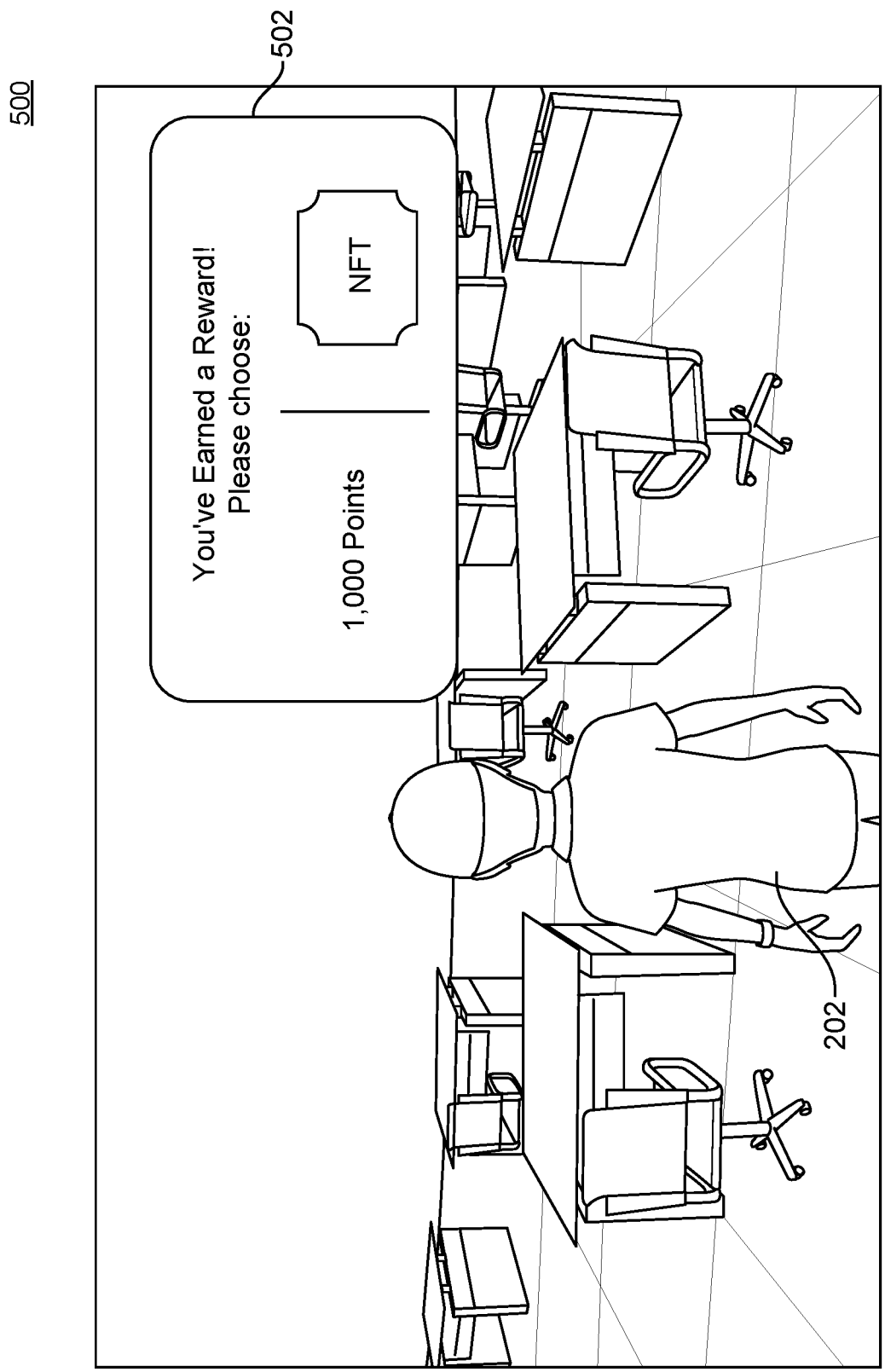
FIG. 5 is an illustration of a resolution reward in the three-dimensional virtual world, according to some aspects of the present disclosure.

FIG. 5 is an illustration of a resolution reward 502 in the three-dimensional virtual world, according to some aspects of the present disclosure. As described with reference to FIG. 2, a user can interact in the three-dimensional virtual world through virtual avatar 202 and can view the three-dimensional virtual world through a perspective of virtual camera 204. The three-dimensional virtual world can also include the resolution reward 502. The three-dimensional virtual world can be configured to include resolution reward 502 as a virtual world object. Resolution reward 502 can be a virtual world object as described with reference to FIG. 1. For example, resolution reward 502 can be a virtual world object allowing a user to select, using sensors 122 of headset 120, a reward. The reward can include fiat currency, points useful as money in a store (e.g., 1,000 points), non-fungible tokens, or any other reward.

Figure 6:
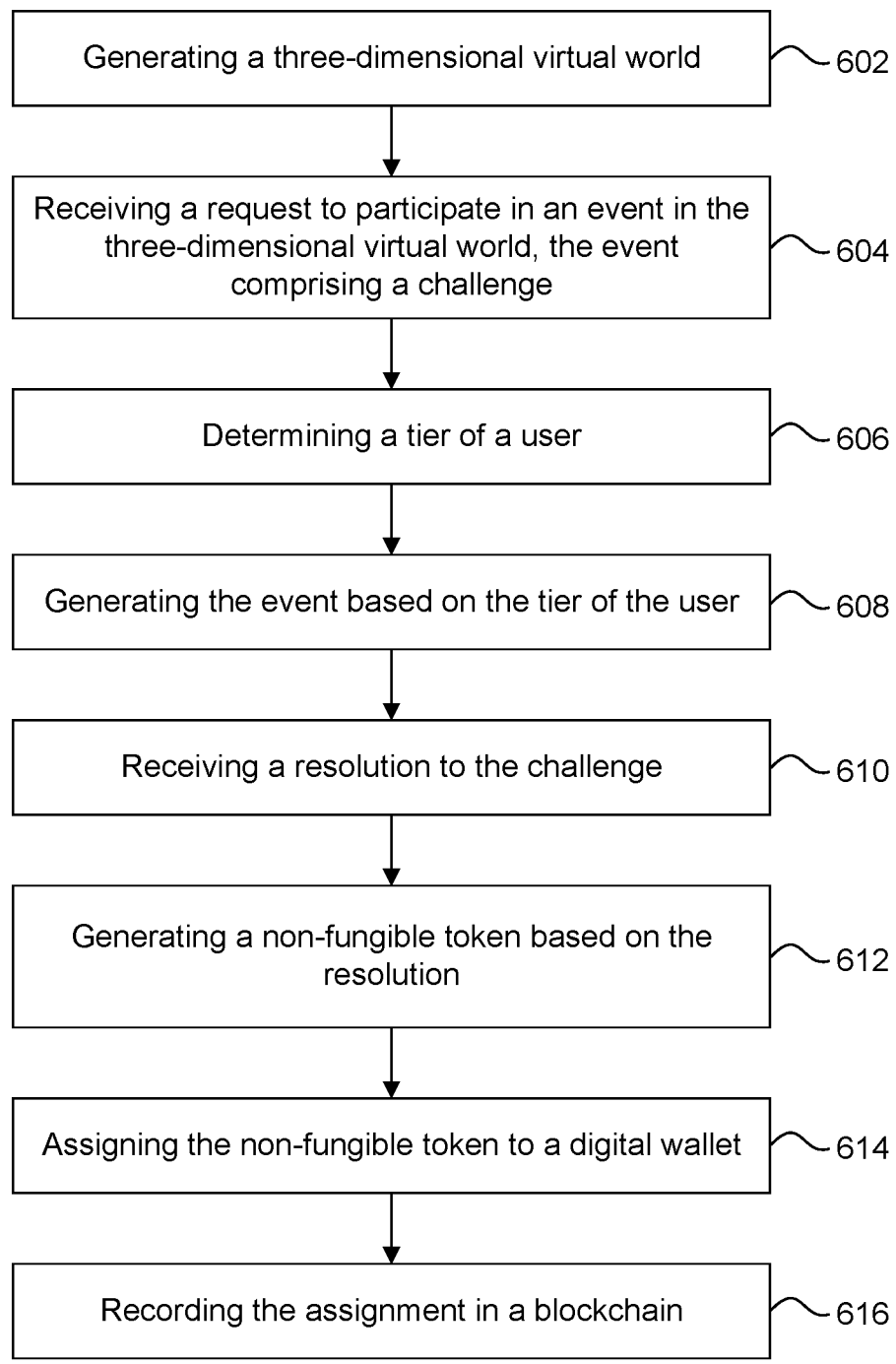
FIG. 6 is a flowchart of a method for dispersing a non-fungible token in response to a security program, according to some aspects of the present disclosure.

FIG. 6 is a flowchart of a method 600 for dispersing a non-fungible token in response to a security program, according to some aspects of the present disclosure. It is to be appreciated that not all steps can be needed to perform the disclosure provided herein. Further, some of the steps can be performed simultaneously, or in a different order than shown in FIG. 6, as will be understood by a person of ordinary skill in the art. Method 600 can be implemented by virtual world platform 110. However, method 600 is not limited to that example aspect.

In 602, virtual world platform 110 generates a three-dimensional virtual world. A user can interact in the three-dimensional virtual world from a perspective of a virtual camera corresponding to a virtual avatar. The virtual camera and the virtual avatar can be controlled by a user device.

The three-dimensional virtual world can be configured to support multiple users. For example, the user can be a first user interacting in the three-dimensional virtual world from a perspective of a first virtual camera corresponding to a first virtual avatar. A second user can interact in the three-dimensional virtual world from a perspective of a second virtual camera corresponding to a second virtual avatar.

For example, the three-dimensional world can be generated by AR/VR/MR service 111 of virtual world platform 110, as described with reference to FIG. 1. AR/VR/MR service 111 can generate the three-dimensional virtual world as an augmented reality, virtual reality, or mixed reality environment. For example, the three-dimensional virtual world can be a metaverse.

In some aspects, the three-dimensional virtual world can be generated by compiling data, code, software, instructions, other information, or a combination thereof, using virtual world platform 110, and delivering such information from virtual world platform 110 to headset 120 to be generated by headset 120.

The virtual camera can correspond in location to the virtual avatar. The virtual camera can be understood as the eyes of the virtual avatar, such that the perspective of the virtual camera provides a viewpoint to the user of what the virtual avatar sees in the three-dimensional virtual world. Similar to the eyes of a human, the perspective of the virtual camera can be changed along an x-axis, y-axis, z-axis, pan angle, tilt angle, and yaw angle. The virtual camera can provide a viewing angle or field of view based on the size of the user's viewing device. The virtual camera can also be configured for a user to view the three-dimensional virtual world from a first-person, second-person, or third-person perspective. The virtual avatar can be understood as a three-dimensional model within the three-dimensional virtual world, representing a user. The virtual avatar can be configured as a human-like character, an animal, an object, or another entity. The virtual avatar can be configured to include a real-time video stream of the corresponding user, as captured by a camera on a user device. Similar to human movement, the position of the virtual avatar can be changed in a forward, backward, left, and right direction on an x-axis/y-axis plane, and can access synthetic vertical space in the three-dimensional virtual world on a z-axis (e.g., jumping, going up stairs, etc.). A user can control virtual camera and the virtual avatar using, for example, user interface 121 and sensors 122 of headset 120.

The three-dimensional virtual world can be configured similar to a real-world space, including virtual objects. Virtual objects can be three-dimensional models in the three-dimensional virtual world.

In 604, virtual world platform 110 receives a request to access a test program as part of a security program in the three-dimensional virtual world. The request can be generated using the user device and/or components of headset 120. The test program can include a display of a source code and instructions for the user to resolve a challenge associated with the source code.

In some aspects, the one or more virtual objects of 602 can be interactive. A user can activate an interactive virtual object by positioning their avatar within a predetermined proximity of the virtual object, by clicking on the virtual object (e.g., clicking a computer mouse over the object, touching a touch-screen over the object, etc.), by inputting a pre-configured quick-key, or by other inputs. The one or more virtual objects can include an interactive virtual object that, when activated by a user, generates a request for generation of additional features within the three-dimensional virtual world. In some aspects, the request for additional features within the three-dimensional virtual world can be generated absent an interactive virtual object. The request can be generated by, for example, a user device (e.g., headset 120) and sent to virtual world platform 110.

Additional features can include interactive games, media (e.g., a slideshow of pictures, a video), or other content. In some aspects, the additional features can include the security program. The security program can train users in preventing computer security vulnerabilities, train users in detecting computer security vulnerabilities, train users in resolving computer security vulnerabilities, and/or inform users about computer security vulnerabilities. The security program can be made up of one or more test programs. The test programs can be configured to test different users in different ways. Accordingly, each test program can be configured with relevant content, such as a display of the source code. Each test program can also include instructions for the user to resolve the challenge associated with the source code. For example, a computer security vulnerability can be hidden in the source code and the challenge can be for the user to detect the vulnerability.

In some aspects, a test program challenge can test various computer security vulnerabilities. For example, the test program challenge can provide challenges, such as broken access control, cryptographic failures, injection, insecure design, security misconfiguration, vulnerable and outdated components, identification and authentication failures, software and data integrity failures, security logging and monitoring failures, server-side request forgery, and/or other network and/or software development security issues. In some aspects, a test program challenge can be based on an Open Worldwide Application Security Project (OWASPR) computer security vulnerability. For example, the test program challenge can be based on an OWASPR Top 10 Web Application Security Risk. In 606, virtual world platform 110 determines a tier of the user. The tier can indicate progress of the user in resolving challenges corresponding to the security program.

The specific content of the test program from 604 can be based on the knowledge or experience of a particular user. Information on the knowledge or experience of a particular user can be stored in databases, such as user account database 116. In some aspects, user account database 116 can store information about progress of a user in resolving challenges corresponding to a security program. In an example aspect, user account database 116 can store data tables including information on user tier assignments. For example, user account database 116 can store a table including five tier possibilities. Tier 1 can indicate that a user is able to find and remediate vulnerabilities within various technologies. Tier 2 can indicate that a user is able to attack and compromise an application, server, and micro service. Tier 3 can indicate that a user is able to integrate tools within web, mobile, API, cloud, and/or mainframe systems. Tier 4 can indicate that a user is able to analyze, interpret, and communicate complex vulnerabilities. Tier 5 can indicate that a user can illustrate and organize data or processes for multiple use cases. In some aspects, a data table can be configured with more or less than five possible tiers.

In 608, virtual world platform 110 generates the test program based on the tier of the user. The test program can be generated on the user device through the perspective of the virtual camera.

The test program can be a collaboration test program, a competition test program, or a capture-the-flag competition. For example, two users can collaborate with one another in resolving a challenge associated with a test program source code. Alternatively, two users can compete against one another in resolving a challenge associate with a test program source code. A capture-the-flag competition may include a program where users, or teams of users, collect flags by solving a number of challenges.

The test program can include a coding laboratory. In some aspects, the coding laboratory can include one or more computer vulnerability explanations in text format or video format. A coding laboratory can also include simulated computer attack walkthroughs, demonstrating to a user a process for resolving a computer attack.

In aspects involving multiple users, a second request can be received to access the test program in the three-dimensional virtual world. The second request can be generated using a second user device. Then, the test program can be generated on the second user device through the perspective of the second virtual camera.

In some aspects, 608 can include selecting the challenge from a plurality of challenges corresponding to the security program. This selection can be based on the tier of the user.

In 610, virtual world platform 110 receives a resolution to the challenge associated with the source code. The resolution can be generated using the user device. For example, using sensors 122 of headset 120, a user can generate one or more resolutions to the test program challenges. Resolutions can include user inputs corresponding to identified errors, problems, or vulnerabilities in source code; user inputs corresponding to defenses for source code; user inputs for attacking source code; or other user inputs related to the challenge and the source code.

The resolution can be communicated to AR/VR/MR service 111 through communication interface 123, network 130, and communication interface 112. Upon receiving a resolution from a user (e.g., through headset 120) to a challenge associate with source code in a test program, a reward (e.g., non-fungible token) can be generated.

In 612, virtual world platform 110 generates a non-fungible token based on the resolution. The non-fungible token is an example of a reward that can be generated by, for example, blockchain interface 114. Blockchain interface 114 can generate a reward based on the resolution. The reward can also be displayed to the user through the perspective of the virtual camera, such as through headset 120. The reward can be displayed in the three-dimensional virtual world as an interactive virtual object, where a user can select the reward or can select one of multiple possible rewards.

In 614, virtual world platform 110 assigns the non-fungible token to a digital wallet corresponding to the user. For example, the digital wallet can correspond to a blockchain wallet stored on blockchain 140, an asset account, a financial account, or another digital account capable of settling transactions, such as microtransactions.

In 616, virtual world platform 110 causes assignment of the non-fungible token to be recorded on a blockchain. For example, blockchain 140 can be configured as a record for assignment of non-fungible tokens or other rewards Blockchain 140 can include a digital wallet, such as a blockchain wallet, useful when recording assignment of non-fungible tokens or other rewards to blockchain 140. For example, when a non-fungible token is generated by blockchain interface 114 based on a resolution to a test program challenge, blockchain interface 114 can interact with blockchain 140, via communication interface 112 and/or network 130, to assign the non-fungible token to a digital wallet corresponding to the user. The assignment can be recorded on blockchain 140.

In some aspects, a metric associated with the user can be generated. For example, the metric can be generated by virtual world processor 113. The metric can be based on the tier of the user, the test program, the resolution, and the non-fungible token. The metric can indicate a level of improvement in detecting computer vulnerabilities. The metric can be generated using an artificial intelligence engine.

Figure 7:
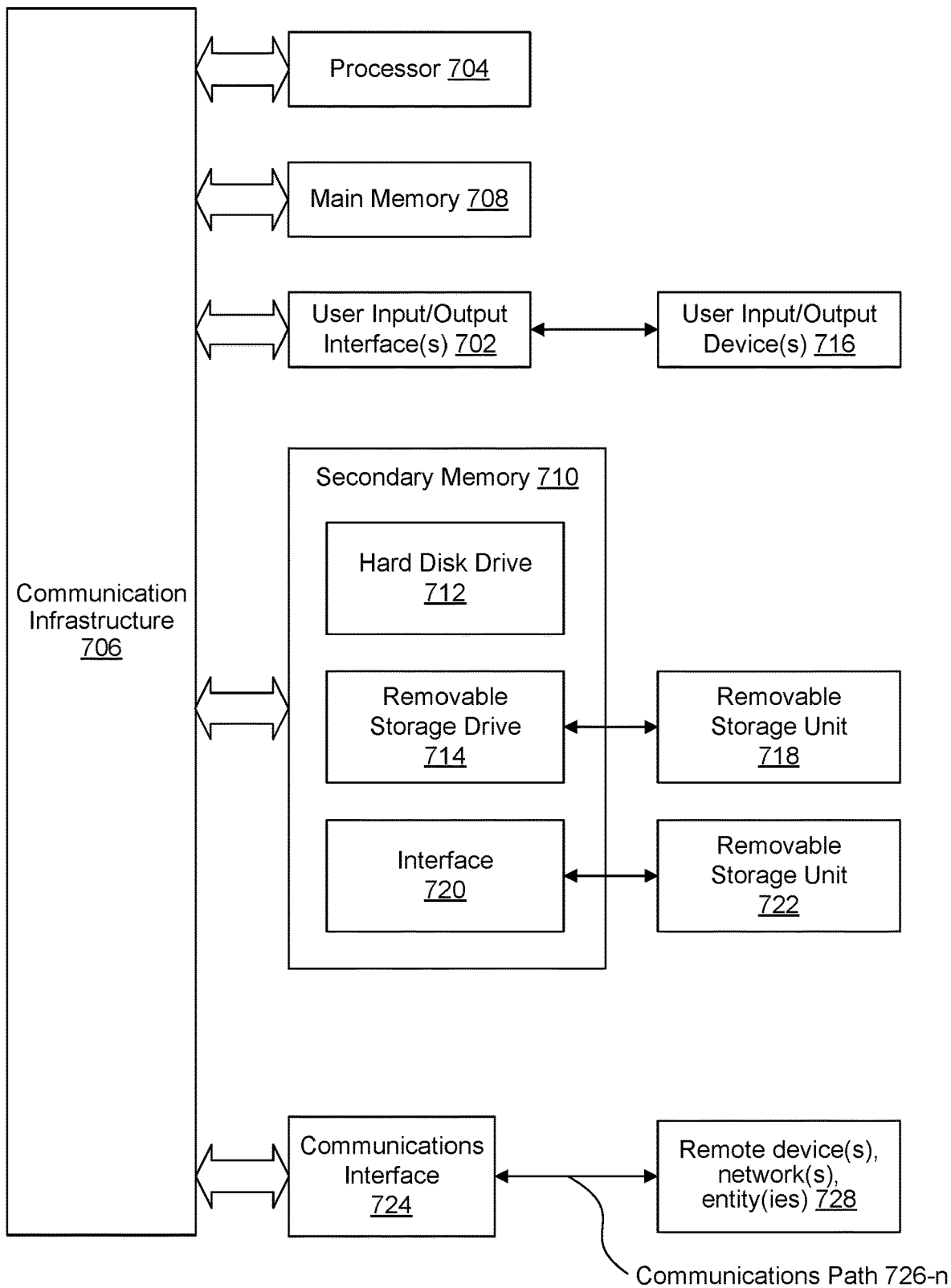
FIG. 7 is a block diagram of an example computer system useful for implementing various aspects.

Various aspects can be implemented, for example, using one or more computer systems, such as computer system 700 shown in FIG. 7. Computer system 700 can be used, for example, to implement one or more components of security gamification environment 100. For example, computer system 700 can generate a three-dimensional virtual world, generate test programs, and generate non-fungible tokens in response to the test programs. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 can each be a graphics processing unit (GPU). In an aspect, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 700 also includes user input/output device(s) 716, such as monitors, keyboards, pointing devices, etc., that communicate with communication infrastructure 706 through user input/output interface(s) 702.

Computer system 700 also includes a main or primary memory 708, such as random access memory (RAM). Main memory 708 can include one or more levels of cache. Main memory 708 has stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 includes a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 reads from and/or writes to removable storage unit 718 in a well-known manner.

According to an exemplary aspect, secondary memory 710 can include other means, instrumentalities or other approaches for allowing computer programs and/or other instructions and/or data to be accessed by computer system 700. Such means, instrumentalities or other approaches can include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 enables computer system 700 to communicate and interact with any combination of remote devices, remote networks, remote entities, etc. (individually and collectively referenced by reference number 728). For example, communication interface 724 can allow computer system 700 to communicate with remote devices 728 over communications path 726, which can be wired and/or wireless, and which can include any combination of LANs, WANs, the Internet, etc. Control logic and/or data can be transmitted to and from computer system 700 via communication path 726.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 7. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer-implemented method for dispersing a non-fungible token in response to a security program, comprising:
    generating a three-dimensional virtual world, wherein a user interacts in the three-dimensional virtual world from a perspective of a virtual camera corresponding to a virtual avatar, wherein the virtual camera and the virtual avatar are controlled by a user device;
    receiving a request to access a test program as part of the security program in the three-dimensional virtual world, wherein the request is generated using the user device, and wherein the test program comprises a display of a source code and instructions for the user to resolve a challenge associated with the source code;
    determining a tier of the user, wherein the tier indicates progress of the user in resolving challenges corresponding to the security program;
    generating the test program based on the tier of the user, wherein the test program is generated on the user device through the perspective of the virtual camera;
    receiving a resolution to the challenge associated with the source code, wherein the resolution is generated using the user device;
    generating the non-fungible token based on the resolution;
    assigning the non-fungible token to a digital wallet corresponding to the user; and
    recording assignment of the non-fungible token on a blockchain.

2. The computer-implemented method of claim 1, wherein generating the test program based on the tier of the user comprises selecting the challenge, from a plurality of challenges corresponding to the security program, based on the tier of the user.

3. The computer-implemented method of claim 1, wherein the user is a first user interacting in the three-dimensional virtual world from a perspective of a first virtual camera corresponding to a first virtual avatar, wherein a second user interacts in the three-dimensional virtual world from a perspective of a second virtual camera corresponding to a second virtual avatar, and the method further comprises:
    receiving a second request to access the test program in the three-dimensional virtual world, wherein the second request is generated using a second user device; and
    generating the test program on the second user device through the perspective of the second virtual camera.

4. The computer-implemented method of claim 1, wherein the test program is a collaboration test program.

5. The computer-implemented method of claim 1, wherein the test program is a competition test program.

6. The computer-implemented method of claim 1, further comprising generating a metric associated with the user based on the tier of the user, the test program, the resolution, and the non-fungible token, wherein the metric indicates a level of improvement in detecting computer vulnerabilities.

7. The computer-implemented method of claim 1, wherein the request is received in response to the user activating, through the user device, a virtual object within the three-dimensional virtual world.

8. The computer-implemented method of claim 1, wherein the test program comprises a capture-the-flag competition.

9. The computer-implemented method of claim 1, wherein the challenge is based on an Open Worldwide Application Security Project computer vulnerability.

10. The computer-implemented method of claim 1, wherein the test program comprises a coding laboratory further comprising one or more computer vulnerability explanations and simulated computer attack walkthroughs.

11. A system for dispersing a non-fungible token in response to a security program, comprising:
    a computing device, comprising:
        a processor; and
        a memory, wherein the memory contains instructions stored thereon that when executed by the processor cause the computing device to:
            generate a three-dimensional virtual world, wherein a user interacts in the three-dimensional virtual world from a perspective of a virtual camera corresponding to a virtual avatar, wherein the virtual camera and the virtual avatar are controlled by a user device;
            receive a request to access a test program as part of the security program in the three-dimensional virtual world, wherein the request is generated using the user device, and wherein the test program comprises a display of a source code and instructions for the user to resolve a challenge associated with the source code;
            determine a tier of the user, wherein the tier indicates progress of the user in resolving challenges corresponding to the security program;
            generate the test program based on the tier of the user, wherein the test program is generated on the user device through the perspective of the virtual camera;

receive a resolution to the challenge associated with the source code, wherein the resolution is generated using the user device;

generate the non-fungible token based on the resolution;

assign the non-fungible token to a digital wallet corresponding to the user; and record assignment of the non-fungible token on a blockchain.

12. The system of claim 11, wherein to generate the test program the memory contains further instructions stored thereon that when executed by the processor cause the computing device to select the challenge, from a plurality of challenges corresponding to the security program, based on the tier of the user.

13. The system of claim 11, wherein the user is a first user interacting in the three-dimensional virtual world from a perspective of a first virtual camera corresponding to a first virtual avatar, wherein a second user interacts in the three-dimensional virtual world from a perspective of a second virtual camera corresponding to a second virtual avatar, and the memory contains further instructions stored thereon that when executed by the processor cause the computing device to:

receive a second request to access the test program in the three-dimensional virtual world, wherein the second request is generated using a second user device; and generate the test program on the second user device through the perspective of the second virtual camera.

14. The system of claim 11, wherein the request is received in response to the user activating, through the user device, a virtual object within the three-dimensional virtual world.

15. The system of claim 11, wherein the test program comprises a capture-the-flag competition.

16. A non-transitory computer-readable medium having instructions stored thereon that, when executed by at least one computing device, cause the at least one computing device to perform operations comprising:

generating a three-dimensional virtual world, wherein a user interacts in the three-dimensional virtual world from a perspective of a virtual camera corresponding to a virtual avatar, wherein the virtual camera and the virtual avatar are controlled by a user device;

receiving a request to access a test program as part of a security program in the three-dimensional virtual world, wherein the request is generated using the user device, and wherein the test program comprises a display of a source code and instructions for the user to resolve a challenge associated with the source code;

determining a tier of the user, wherein the tier indicates progress of the user in resolving challenges corresponding to the security program;

generating the test program based on the tier of the user, wherein the test program is generated on the user device through the perspective of the virtual camera;

receiving a resolution to the challenge associated with the source code, wherein the resolution is generated using the user device;

generating a non-fungible token based on the resolution;

assigning the non-fungible token to a digital wallet corresponding to the user; and recording assignment of the non-fungible token on a blockchain.

17. The non-transitory computer-readable medium of claim 16, wherein generating the test program based on the tier of the user comprises selecting the challenge, from a plurality of challenges corresponding to the security program, based on the tier of the user.

18. The non-transitory computer-readable medium of claim 16, wherein the user is a first user interacting in the three-dimensional virtual world from a perspective of a first virtual camera corresponding to a first virtual avatar, wherein a second user interacts in the three-dimensional virtual world from a perspective of a second virtual camera corresponding to a second virtual avatar, and further comprising:

receiving a second request to access the test program in the three-dimensional virtual world, wherein the second request is generated using a second user device; and generating the test program on the second user device through the perspective of the second virtual camera.

19. The non-transitory computer-readable medium of claim 16, wherein the request is received in response to the user activating, through the user device, a virtual object within the three-dimensional virtual world.

20. The non-transitory computer-readable medium of claim 16, wherein the test program comprises a capture-the-flag competition.

* * * * *